Patented May 1, 1945

2,375,008

UNITED STATES PATENT OFFICE 2,375,008

CARBONACEOUS MATERIAL

Robert W. Lawrence, Wilmington, Del., assignor to Hercules Powder Company, Wilmington, Del., a corporation of Delaware No Drawing. Application September 19, 1942, Serial No. 459,007

7 Claims. (Cl. 117—100)

This invention relates to the production of an improved cellular carbonaceous material, and more particularly to a cellular carbonaceous free flowing material in particulate form having increased resistance to compressive force.

In the prior art many cellular carbonaceous materials have been used as insulation, filling, packing, combustibles, and molding bases with varying degrees of success. In general, however, materials which are of the correct density and properties, especially free flowing, are not sufficiently resistant to compresive force to prevent collapse of the cell structure under conditions of use.

This invention has as an object the production of a new and improved cellular carbonaceous free flowing material in particulate form which has a supporting film or glaze so that the particulate material has increased resistance to compressive force. Another object of this invention is to provide a process for treating a particulate, cellular carbonaceous material with a supporting film of a heat-hardening resin. Another object of this invention is to provide a process for treating a particulate, cellular carbonaceous material to produce a supporting film or glaze without rupturing the cell walls of the material or filling any appreciable number of the internal cells with material comprising the supporting film. Still another object of this invention is the provision of a cellular, absorbent, carbonaceous material in particulate form which has increased resistance to collapse under pressure and is free flowing. Other objects will be apparent hereinafter.

These objects are accomplished in accordance with this invention by treating porous or cellular, low density, absorbent, carbonaceous material with a heat-hardening synthetic resin so that the carbonaceous material in particulate form has its outer cellular structure strengthened without appreciably altering the internal cellular structure of the individual particles, thereby maintaining substantially the original physical properties of the material while greatly increasing its compressive strength.

The carbonaceous materials which are suitable for this purpose include cork, balsa, bagasse, bongo wood, corncobs, and their equivalents which have been comminuted to a desired screen size to reduce them to particulate form. The treatment to which they are subjected involves coating of the material while in particulate form at an elevated temperature with heat-hardening synthetic resins such as the urea-aldehyde, phenol-aldehyde, thiourea-aldehyde type resins and the like; and subsequently heat-hardening the resin in situ. The synthetic resins may be formed and hardened on the carbonaceous ingredient or applied as an intermediate condensation product, from a solution in water or an organic solvent, which is hardened after evaporation of the solvent. Thus, in accordance with this invention, the resins are formed as a supporting film on the individual particles of the particulate carbonaceous material and thus strengthen and support the unaltered interior cellular structure of these individual particles. Having now described the invention in general terms, the invention is described in greater detail by way of examples referring to the treatment of ground cork with a urea-formaldehyde resin and to the treatment of ground corncobs (meal) treated with a similar resin.

The cork used in accordance with this invention will normally have a fair proportion on a 20-mesh screen. This gradation is not, however, assential to the invention. Samples of cork with the following screen analyses have given good results.

| Screen test | A | B | C | D | E |
|---|---|---|---|---|---|
|  | Per cent | Per cent | Per cent | Per cent | Per cent |
| On 12 mesh | 0.5 | Nil | 1.0 | Nil | Nil |
| On 20 mesh | 58.5 | 42.0 | 79.5 | 100 | Nil |
| On 30 mesh | 22.5 | 50.0 | 15.5 |  | 100 |
| On 40 mesh | 17.5 | 6.0 | 3.0 |  |  |
| Through 40 mesh | 1.0 | 2.0 | 1.0 |  |  |

The treatment may be carried out in the following manner. The ground cork is placed in a suitable vessel and heated to about 70° C. with agitation and a solution of urea in an aqueous formaldehyde solution is added to the cork and the individual cork particles of the mixture thoroughly coated by continued agitation. The mixture may then further be heated to cause condensation of the urea-formaldehyde resin and to dry the treated cork. This drying may conveniently be carried out at about 70–100° C. The coated cork and resin are then again further heated to harden the resin. This may be done by heating with constant agitation for about an hour or more at 100° C. or for shorter periods at temperatures up to 150° C. This hardening procedure may be varied considerably to obtain proper condensation but the resin must be continually agitated in order to uniformly harden the individual particles and maintain them in particulate form.

Alternatively the urea-formaldehyde solution may be sprayed on the hot cork and the mixture dried and the resin hardened as before. This is particularly advantageous since it has been found that when the urea-formaldehyde solution is added to cold cork, there is a tendency for the cork to form an insulating sheet on the bottom of the treating vessel. This is because the condensation reaction tends to take place against the hot surface of the vessel and cement the cork into a mat. By spraying the solution on hot cork the condensation takes place in the bulk of the mixture where agitation is adequate and there is less tendency to stick the cork particles to the walls of the vessel.

The preferable ratio of urea to formaldehyde is about 1 part of urea to about 2.5 parts of 40% formalin (37% formaldehyde by weight), however, the ratio may be varied over wide limits, for example, from 1 part of urea and 1.5 parts of 40% formalin to 1 part of urea and 5 parts of 40% formalin, although still wider ranges will be found satisfactory in some cases. Furthermore, the solutions may be diluted to any desired degree, although for economy of operation it is desirable to use quite concentrated solutions.

Instead of preparing the resin in the above described manner, a partial condensation product of urea and formaldehyde may be prepared by methods well-known in the art which product can be applied, from an aqueous solution or from solution in an organic solvent such as ethyl or butyl alcohol, to the carbonaceous material which is then heated at an elevated temperature, the solvent evaporated, and the resin heat-hardened.

In treating cork with urea-formaldehyde solution, excellent results were obtained when the quantities used were such as to give a final product containing from 20–45% of resin. The preferred range, however, is from about 30–40% resin by weight of the final treated cork.

The corncob meal used in accordance with this invention will normally have a fair proportion on a 20-mesh screen. This gradation is not, however, essential to the invention. The corncob meal may consist of the entire product of the ground corncobs or may be segregated into various fractions. The woody outer portion has given excellent results while the interior pithy material has a tendency to impregate, which is highly undesirable. However, it has been noted that by proper preheating of the pithy material, in the order of 80° C., condensation is accelerated and the deleterious effects of impregnation are greatly reduced. Samples of corncob meal with the following screen analyses have given good results.

| Screen test | A | B | C | D |
|---|---|---|---|---|
|  | Per cent | Per cent | Per cent | Per cent |
| On 12 mesh | 4.4 | 1.5 | 1.5 | Nil |
| On 20 mesh | 39.2 | 42.4 | 40.3 | 12.1 |
| On 40 mesh | 39.9 | 36.2 | 37.8 | 66.9 |
| On 60 mesh | 9.0 | 11.1 | 10.4 | 14.6 |
| On 100 mesh | 5.8 | 5.7 | 6.2 | 4.5 |
| Through 100 mesh | 3.7 | 3.1 | 3.8 | 1.9 |

The treatment of corncob meal may be carried out in the following manner. The corncob meal is placed in a suitable vessel and a solution of urea in an aqueous formaldehyde solution is added to the meal and the individual meal particles of the mixture thoroughly coated by continued agitation. The mixture may then further be heated to cause condensation of the urea-formaldehyde resin and to dry the treated corncob meal. This drying may be conveniently carried out at about 60 to 100° C. Heating is continued to harden the resin. This may be done by heating with constant agitation for about an hour or more at 90 to 110° C. or for shorter periods at temperatures up to 150° C. This hardening procedure may be varied considerably to obtain proper condensation but the resin must be continually agitated in order to uniformly harden the individual particles and maintain them in particulate form.

In general, the whole process is carried out in a single continuous operation, thus the corncob meal is placed in a drying vessel, steam is turned on, the urea-formaldehyde solution is added to the meal which is continuously agitated and the temperature is raised to a final temperature of from about 90 to about 150° C., preferably of from about 100 to about 120° C. The whole operation requires 4 to 6 hours.

Alternatively, the corncob meal may be preheated to a temperature up to 100° C., with about 60° C. being preferable, prior to spraying the urea-formaldehyde solution onto the meal. The condensation of the resin, drying of the mixture, and hardening of the resin are then accomplished by raising the temperature from about 90 to about 120° C., the whole operation requiring about 3 to 6 hours. As pointed out before, if the corncob meal has a high percentage of pithy material, this preheating step is essential and should be carried out at as high a temperature as possible in order to prevent the pithy constituent from being impregnated.

The ratio of urea to formaldehyde may be varied over wide limits, for example, from 1 part of urea and 1.5 parts of 40% formalin (37% formaldehyde by weight) to 1 part of urea and 5 parts of 40% formalin, although still wider ranges will be found satisfactory in some cases. Furthermore, the solutions may be diluted to any desired degree, although for economy of operation it is desirable to use quite concentrated solutions.

Instead of preparing the resin in the above described manner, a partial condensation product of urea and formaldehyde may be prepared by methods well-known in the art which product can be applied, from an aqueous solution or from solution in an organic solvent such as ethyl or butyl alcohol, to the carbonaceous material which is heated at an elevated temperature to evaporate the solvent and harden the resin.

In treating corncob meal with urea-formaldehyde solution, excellent results were obtained when the quantities used were such as to give a final product containing from 25 to 40% of resin. The preferred range, however, is from about 30 to 40% resin by weight of the final treated corncob meal.

Other carbonaceous ingredients such as balsa, bongo wood, or bagasse may be used in accordance with this invention.

In the use of phenol-aldehyde resins, the resin is formed in the fragmentary and ruptured cellular surface of the carbonaceous material, in a manner similar to the urea-aldehyde resin. For example, cresol may be dissolved in 37% formaldehyde solution, catalyst stirred in, and the mixture added to the heated carbonaceous material. By further heating the mixture of material with the cresol and formaldehyde, condensation, drying and hardening of the resin are accomplished. The final hardening operation can be carried out at temperatures in the range of 100 to 150° C. without appreciable disruption of the internal cellular structure of the carbonaceous material.

Other heat-hardening resins or combinations thereof may be used. For example, a combination of chlorinated rubber and a heat-hardening phenol-aldehyde resin, such as Bakelite No. 3360, gives good results when applied to hot cork or corncob meal from an organic solvent and then heat-hardened. Alternatively, these materials may be applied from an aqueous emulsion of a concentrated solution of these materials in an organic solvent. This has the advantage of limiting the quantity of solvent used, thus reducing the fire hazard and eliminating the necessity of installing a recovery system for the solvent.

The carbonaceous ingredients such as cork, balsa, bagasse, corncob meal, etc., treated with a suitable heat-hardening resin have a harsh and slightly gritty feel in contrast to the soft and compressible qualities of the untreated material. These treated materials withstand compression and maintain their internal cellular structure under quite high pressures.

In the preparation of the specially treated carbonaceous material, three factors are of special importance: First, the carbonaceous material should be moderately heated to drive off volatile matter, such as moisture vapor from the cellular structure of the material without rupturing the internal cells of said material, and particularly to promote the condensation of the resin ingredients in the outer cellular structure of the carbonaceous material; second, the resin ingredients should be maintained in a relatively low viscosity phase to insure uniform coating of the individual particles and assimilation throughout the mass of particulate material; and third, subsequent hardening of the resin on the individual particles of the mass of particulate material to form a hard, tough coating on the surface of the particles, thereby giving them high compressive strength without altering their internal cellular structure.

Several embodiments of the invention are shown in the following examples:

Example 1

A quantity of ground cork was treated with urea-formaldehyde resin in the following manner: The cork, 354 lbs., was placed in a pan dryer and heated to about 150–160° F. Meanwhile, a solution was prepared by dissolving 134 lbs. of urea in 402 lbs. of a 37% (by weight) aqueous solution of formaldehyde. This solution was then sprayed on the hot cork, which was being constantly mixed by rotating plows, over a period of about ½ hour. Heating was continued until the cork was dry and the temperature had reached about 200° F., a period of about seven hours. The cork was then discharged from the dryer and after cooling was ready for use. The quantity of treated cork obtained was 549 lbs. and contained 38.3% of resin. The cork showed the following screen analysis:

| | Percent |
|---|---|
| On 12 mesh | 2 |
| On 20 mesh | 38 |
| On 30 mesh | 36 |
| On 40 mesh | 14 |
| On 60 mesh | 4 |
| Through 60 mesh | 6 |

Other properties of the cork before and after treating are the following:

| | | Untreated | Treated |
|---|---|---|---|
| Apparent density | g./cc. | 0.09 | 0.19 |
| Moisture | | 5.6 | 1.2 |
| Resin content | per cent | | [1] 38.3 |

[1] Of dry weight.

The treated cork felt crisp and hard in contrast to the softness of the untreated granulated cork.

Example 2

Five hundred parts by weight of ground cork was mixed with 700 parts by weight of 37% (by weight) formaldehyde solution to which 26 parts by weight of concentrated hydrochloric acid had been added to serve as a catalyst. Two hundred sixteen parts by weight of cresol was added and the whole mixed together. The treated cork mixture was then dried while continuing agitation and the resin hardened by heating for seven hours at about 135° C. A yield of 706 parts by weight of treated cork containing 33% of resin was obtained.

Example 3

A solution consisting of 190 parts by weight of thiourea in 442 parts by weight of 37% (by weight) formalin solution was prepared by heating the mixture until the thiourea dissolved. The solution was added to 500 parts of cork which had been heated to about 100° C. The mixture was dried with continued agitation and the resin hardened by heating for 2 hours at 135° C. Seven hundred forty-five parts by weight of treated cork containing 36.5% of resin was obtained.

Example 4

Five hundred parts by weight of ground balsa wood was placed in a steam-jacketed kettle equipped with a stirring device. A solution of 126 parts by weight of urea dissolved in 580 parts by weight of 37% (by weight) formalin solution was added to the balsa, which was at room temperature, and the mixture was stirred for half an hour. Then the kettle was heated for 4 hours with steam to effect the resin reaction and to dry the mixture with continued stirring. The mixture was finally heated with 90 lbs. steam for about two hours to complete the drying and harden the resin. A yield of 665 parts by weight of balsa, containing about 28.5% of resin, resulted.

The ground balsa wood used in this example showed the following screen analysis:

| | Per cent |
|---|---|
| On 12 mesh | 1.0 |
| On 20 mesh | 39.5 |
| On 30 mesh | 20.5 |
| On 40 mesh | 12.5 |
| Through 40 mesh | 26.5 |

Example 5

Three hundred pounds of corncob meal was placed in a steam-jacketed pan dryer and the steam turned on. A solution of 115 lbs. of urea in 275 lbs. of a 37% (by weight) aqueous solution of formaldehyde was sprayed onto the corncob meal, which was continuously agitated, and continuously sprayed for about 1 hour. Heating and agitation were continued until the treated corncob meal was dry and the resin had been hardened. The maximum temperature needed was about 215° F. and the total operation required about 4 hours. The product contained 34% of resin and had an apparent density of 0.33 g./cc.

Example 6

Five hundred parts by weight of bagasse was placed in a steam-jacketed mixing kettle and a solution containing 190 parts by weight of urea and 562 parts by weight of 37% (by weight) of formaldehyde solution was added to the bagasse. Steam was applied to the jacket and the material was dried and the resin hardened with continued agitation during a period of 2 hours.

About 693 parts by weight of treated bagasse containing 31% of resin was obtained.

The screen analysis of the treated bagasse was as follows:

| | Per cent |
|---|---|
| On 20 mesh | 9 |
| On 30 mesh | 29 |
| On 40 mesh | 16 |
| On 60 mesh | 21 |
| Through 60 mesh | 25 | and its apparent density was 0.17 g./cc.

Example 7

Five hundred parts by weight of bagasse flour was placed in a steam-jacketed kettle and heated with agitation to a temperature of 100° C. A urea-formaldehyde solution was prepared by dissolving 190 parts by weight of urea in 440 parts by weight of an aqueous 37% (by weight) formaldehyde solution. This solution was then sprayed for 30 minutes on the hot bagasse which was continuously agitated. The heating was continued at 100–110° C. for two hours to dry the product and harden the resin. A yield of 755 parts by weight of treated bagasse containing 34.7% of resin was obtained with the following screen analysis:

| | Per cent |
|---|---|
| On 20 mesh | 9 |
| On 30 mesh | 27 |
| On 40 mesh | 18 |
| On 60 mesh | 21 |
| Through 60 mesh | 25 |

The apparent density was 0.18 g./cc.

Example 8

Two hundred seventy pounds of bagasse flour was put in a pan dryer, agitated with rotating plows and steam turned into the jacket thereof. A solution of 90 lbs. of urea in 135 lbs. of formalin solution (37% CH2O by weight) was prepared. About half of the solution was sprayed on the bagasse for 5 minutes. After another half hour when the temperature had risen to 170° F. the remainder of the solution was sprayed on for 5 minutes. Heating was continued with agitation for an additional 5 hours at a temperature of about 200° F. when the product was discharged. A yield of 360 lbs. of treated bagasse containing 30.5% of resin was obtained. Its apparent density was 0.18 g./cc.

Example 9

Five hundred parts by weight of cork was mixed with a solution of 125 parts by weight of 20 cp. chlorinated rubber and 125 parts by weight of Bakelite 3360 in 500 parts by weight of toluene. The mixture was then agitated in a steam-jacketed kettle and finally heated for a period of 2 hours at 135° C. About 720 parts by weight of treated cork containing 34% of resin was obtained.

It is evident that there are numerous factors which will influence conditions for the most satisfactory operation of the invention, the actual limits of which cannot be established except by a detailed study of each set of raw materials and the intermediate and finished products involved.

Examination of the treated particles of material under a microscope revealed that the fragmentary outer cells and ruptured adjacent cells only were filled with resin to form the supporting film, while the inner cells which were not ruptured retained their original form and were not impregnated by the resin treatment. This fact was further emphasized when subjecting the treated particles to a needle test under the microscope. In this test it was noted, in observing sections of treated and untreated particulate material, that the cells adjacent the outer surface of a treated particle were extremely rigid while the interior cells of the particle had apparently the same resistance to compression by the needle as the cells of untreated material. In cork it was found that the resin had formed a supporting film about 2 cells deep, while in particles of bagasse, balsa wood, and corncob meal the supporting film was deeper due to the more open nature of the cellular structure and size of cells. Corncob meal had the greatest depth of supporting film of the various materials treated, this depth was from 3 to 6 cells which, accordingly, gave the corncob meal the highest compressive strength of the various treated materials.

A distinct advantage of treating particulate material in accordance with the present invention resides in the fact that the particulate material is less dense than material prepared by prior art impregnation methods, but still has high compressive strength. This is due to the coating of resin material which imparts a strong outer shell to the individual particles of material while substantially preserving their original internal cellular structure.

The treated carbonaceous material in the form of particulate material described in the above examples has been found suitable and extremely advantageous when used as insulation for houses, especially when it is desirable to blow the material into the walls as the individual particles of the materials remain intact and do not agglomerate and are so small that they readily filter into small crevices. Further, after the filling of the walls, the material does not tend to settle due to compression and leave uninsulated sections. These treated carbonaceous materials are also advantageous when used as insulation for refrigeration units and the like. The supporting film on the individual particles of the material prevents compression of the material with the resulting exclusion of the air pockets. These air pockets are known to provide the most effective insulation obtainable and it is the preservation of the internal cell structure of the individual particles which imparts a high thermo-resistance to these carbonaceous materials.

These new carbonaceous materials having their internal cellular structure intact and unaltered present various advantages when used as combustibles in explosive and as fillers for molded articles.

It will be understood that the details and examples hereinbefore set forth are illustrative only and that the invention as broadly described and claimed is in no way limited thereby.

This is a continuation-in-part of my copending application Serial No. 326,654, filed March 29 1940.

What I claim and desire to protect by Letters Patent is:

1. A low-density, free-flowing particulate material of high compressive strength comprising cellular carbonaceous particles selected from the group consisting of cork, balsa, bagasse, bongo wood and corncobs, said particles being of a size that substantially all of the particles will pass a 12-mesh screen and be retained by a 100-mesh screen and the said particles having the outer cellular structure thereof, to a depth of between about 2 and about 6 cells, supported by a synthetic heat-hardened resin to form a rigid structure, said resin being present in an amount between about 25% and about 40% by weight.

2. A low-density, free-flowing particulate material of high compressive strength comprising cellular particles of corncob meal, said particles being of a size that substantially all of the particles will pass a 12-mesh screen and be retained by a 100-mesh screen and the said particles having the outer cellular structure, to a depth of between about 3 and about 6 cells, supported by a synthetic heat-hardened resin to form a rigid structure, said resin being present in an amount between about 25% and about 40% by weight.

3. A low-density, free-flowing particulate material of high compressive strength comprising cellular particles of cork, said particles being of a size that substantially all of the particles will pass a 12-mesh screen and be retained by a 60-mesh screen and the said particles having the outer cellular structure, to a depth in the order of 2 cells, supported by a synthetic heat-hardened resin to form a rigid structure, said resin being present in an amount between about 25% and about 40% by weight.

4. A low-density, free-flowing particulate material of high compressive strength comprising cellular particles of bagasse, said particles being of a size that substantially all of the particles will pass a 12-mesh screen and be retained by a 100-mesh screen and the said particles having the outer cellular structure thereof, to a depth of between about 2 and about 6 cells, supported by a synthetic heat-hardened resin to form a rigid structure, said resin being present in an amount between about 25% and about 40% by weight.

5. A low-density, free-flowing particulate material of high compressive strength comprising cellular particles of corncob meal, said particles being of a size that substantially all of the particles will pass a 12-mesh screen and be retained by a 100-mesh screen and the said particles having the outer cellular structure, to a depth of between about 3 and about 6 cells, supported by a urea-formaldehyde heat-hardened resin to form a rigid structure, said resin being present in an amount between about 25% and about 40% by weight.

6. A low-density, free-flowing particulate material of high compressive strength comprising cellular particles of cork, said particles being of a size that substantially all of the particles will pass a 12-mesh screen and be retained by a 60-mesh screen and the said particles having the outer cellular structure, to a depth in the order of 2 cells, supported by a phenol-formaldehyde heat-hardened resin to form a rigid structure, said resin being present in an amount between about 25% and about 40% by weight.

7. A low-density, free-flowing particulate material of high compressive strength comprising cellular particles of bagasse, said particles being of a size that substantially all of the particles will pass a 12-mesh screen and be retained by a 100-mesh screen and the said particles having the outer cellular structure thereof, to a depth of between about 2 and about 6 cells, supported by a urea-formaldehyde heat-hardened resin to form a rigid structure, said resin being present in an amount between about 25% and about 40% by weight.

ROBERT W. LAWRENCE.